(12) United States Patent
Breen et al.

(10) Patent No.: US 7,261,004 B2
(45) Date of Patent: Aug. 28, 2007

(54) FLOW TRANSDUCER AND METHOD

(75) Inventors: Donnelly James Breen, Glen Iris (AU); Walter Henry Berryman, Croydon (AU)

(73) Assignees: Hybrid Electronics Australia Pty, Ltd., Bayswater, Victoria (AU); Monatec Pty, Ltd., Mitcham, Victoria (AU)

( * ) Notice: Subject to any disclaimer, the term of this patent is extended or adjusted under 35 U.S.C. 154(b) by 98 days.

(21) Appl. No.: 11/112,928

(22) Filed: Apr. 22, 2005

(65) Prior Publication Data

US 2006/0005635 A1 Jan. 12, 2006

(30) Foreign Application Priority Data

Oct. 29, 2002 (AU) .............................. 2002952330
Oct. 24, 2003 (WO) .................... PCT/AU03/01416

(51) Int. Cl.
*G01F 1/708* (2006.01)
(52) U.S. Cl. .................................................. 73/861.95
(58) Field of Classification Search ............. 73/204.14, 73/204.26, 204.18, 204.19, 204.25, 204.23, 73/204.27, 861.95, 861, 861.05
See application file for complete search history.

(56) References Cited

U.S. PATENT DOCUMENTS

| 4,043,195 | A | * | 8/1977 | Hunting .................... 73/204.14 |
| 4,458,709 | A | | 7/1984 | Springer |
| 5,156,046 | A | | 10/1992 | Tanimoto et al. |
| 5,243,858 | A | | 9/1993 | Erskine et al. |
| 5,533,412 | A | * | 7/1996 | Jerman et al. ........... 73/861.95 |
| 6,289,746 | B1 | | 9/2001 | Fu et al. |
| 6,460,411 | B1 | * | 10/2002 | Kersjes et al. ........... 73/204.26 |
| 6,550,325 | B1 | * | 4/2003 | Inushima et al. ........ 73/204.26 |
| 2004/0244479 | A1 | * | 12/2004 | Matsumoto et al. ..... 73/204.26 |

FOREIGN PATENT DOCUMENTS

| DE | 44 27 554 | 2/1996 |
| EP | 0072044 | 10/1987 |
| WO | WO95/02164 | 1/1995 |

* cited by examiner

*Primary Examiner*—Jewel Thompson
(74) *Attorney, Agent, or Firm*—Inskeep IP Group, Inc.

(57) ABSTRACT

A transducer is disclosed for sensing flow of a fluid. The transducer includes means for applying a heat pulse to the fluid and at least one temperature sensor. The temperature sensor is adapted to detect a decaying response to the heat pulse to provide an indication of the flow. The decaying response may be detected by comparing measured voltages at a set moment in time or by comparing measured times at a set voltage threshold. A method for sensing flow of a fluid is also disclosed.

35 Claims, 3 Drawing Sheets

Section XX'

US 7,261,004 B2

FLOW TRANSDUCER AND METHOD

CROSS REFERENCE TO RELATED APPLICATIONS

This invention is related to and claims priority from Australian Patent Application No. 2002952330, filed Oct. 29, 2002, entitled Flow Transducer And Method; and PCT Application No. PCT/AU2003/001416, filed Oct. 24, 2003, entitled Flow Transducer And Method, which are incorporated herein by reference.

FIELD OF THE INVENTION

The present invention relates to a flow transducer. In particular the invention relates to a transducer for measuring rate of flow of a fluid. It is desirable to provide a flow transducer in the form of a single or self contained element, monitor or assembly, that is capable of being inserted into a fluid stream. Throughout the specification, the term "fluid" is to be interpreted to include both liquid and gaseous forms of fluid.

BACKGROUND OF THE INVENTION

Various calorimetric flow transducers have been proposed previously. One type is represented by a hot-wire anemometer, in which a thin wire is heated by passage of an electric current, while its electrical resistance is sensed. When the wire is placed within a flowing fluid, typically a gas, a cooling effect of the fluid changes resistivity of the wire, which resistivity provides a measure of velocity of the flowing fluid. Variations of this principle include thin-film and semiconductor implementations.

In another type of calorimetric flow transducer, thermal energy is injected into a fluid at a constant rate, typically by means of an electrical heater. Fluid flowing near the heating element is raised in temperature, and the rise in temperature of the fluid is detected by an electrical sensor (refer U.S. Pat. Nos. 4,028,689, 4,501,144 and 6,314,807 and WO91/19170). This differs from the hot-wire anemometer in that a temperature-rise of the fluid, rather than the cooling effect of the fluid, is detected. The temperature-rise may be sensed downstream from the heater, using a thermistor for example. Improved versions of this principle utilize two temperature-sensors, one upstream of the heater, or co-located with it, and one downstream or spaced some distance from it. A comparison or differential measurement is made between the two temperature-sensors. This arrangement makes the transducer less susceptible to variations in ambient temperature of the associated fluid.

In a transit-time calorimetric flow transducer, heat is applied in the form of a thermal pulse, typically from an electrical heating element driven by an electrical pulse (refer U.S. Pat. Nos. 4,458,709 and 6,289,746). A bolus of heated fluid is carried downstream as part of overall flow. At some time subsequent to the applied pulse, a downstream sensor detects a temperature increase above the prevailing, or ambient, fluid temperature. After a further time-delay, the downstream sensor detects a fall in temperature, when most of the heated fluid has passed. These events may be called the leading and falling edges of the temperature pulse. Generally, there is some mixing of the heated fluid with unheated fluid, so that the thermal pulse passing the downstream sensor is spread out in time, or dispersed, compared with the upstream applied pulse. The transit-time transducer has a disadvantage of requiring access to the fluid stream in two places: a site where thermal energy is injected, and a downstream site for temperature-sensing.

SUMMARY OF THE INVENTION

According to one aspect of the present invention there is provided a transducer for sensing flow of a fluid including means for applying a heat pulse to said fluid and at least one temperature sensor, said temperature sensor being adapted to detect a decaying response to said heat pulse to provide an indication of said flow.

The transducer may include a heater and at least one temperature sensor. The at least one temperature-sensor may respond to a temperature change caused by a heat-pulse generated in the heater. Sensitivity of the flow transducer may be increased by sensing a time at which a decaying response of the at least one temperature sensor crosses a threshold level that is low compared with an initial response of the sensor.

In one embodiment compensation for variation in ambient temperature of the fluid may be achieved by measuring and digitizing temperature of the fluid immediately before the heating pulse is applied, and digitally setting a threshold level relative to this pre-heating pulse measurement. In an alternative embodiment compensation for variation of ambient fluid temperature may be achieved by utilizing a sample-and-hold circuit to store an analog-voltage representation of fluid temperature immediately before the heating pulse is applied, and setting the threshold level relative to the stored voltage. The flow transducer may include a diaphragm, the dimensions and material (metal or alloy) for which may be chosen to maximize sensitivity of the transducer, consistent with a requirement for mechanical strength.

In one embodiment, the temperature transducer may be arranged as a single unit, incorporating the heater and one of more temperature sensors, so that access to the fluid stream is required at only one site. In another embodiment, heating and temperature sensing may be performed at sites that are distinct, meaning that two or more points of access to the fluid stream may be utilized.

The flow transducer may include a head that is rotationally symmetrical about an axis perpendicular to its diaphragm and relative to the direction of fluid flow to make the transducer insensitive to rotation. In some applications, it is desirable that the flow transducer be sensitive to magnitude of flow but not to direction of flow. In such applications, the flow transducer preferably is arranged such that it is insensitive to orientation of the fluid flow and to orientation of any pipe or channel containing the flowing fluid. Rotational insensitivity of the transducer may simplify its installation into the fluid stream, because an adjustment of transducer orientation may not be required. The flow transducer, may be arranged such that it can be inserted into a channel or pipe that is incompletely filled with fluid, and can be used to measure the speed of flow, including an absence of flow and/or absence of fluid.

The flow transducer of the present invention may include an electrically-pulsed heater and a co-located temperature-sensor, together with means for inferring flow-rate from a falling edge of the sensed-temperature pulse. Co-located herein includes arrangements wherein the sensor is on top of, below or adjacent to the heater. When more than one temperature sensor is used, to achieve directional flow-sensing for example, co-located includes that each sensor may be on top of, below or adjacent to the heater. Spatial separation of the sensor and heater is not integral to operation of the transducer, as it is in transit-time transducers as described above. Because of co-location of the sensor and heater, the flow transducer of the present invention may require access to the fluid stream at a single point, which is generally advantageous. Single-point access is especially significant when the transducer is used for temporary monitoring of reticulation systems, such as water-supply networks.

According to a further aspect of the present invention there is provided a method for sensing flow of a fluid including applying a heat pulse to said fluid and detecting a decaying response to said heat pulse to provide an indication of said flow.

The step of detecting the decaying response may be performed at a set moment in time. Alternatively the step of detecting the decaying response may be performed at a set voltage threshold. The detecting may be performed via at least one temperature sensor and the voltage threshold may be set low relative to an initial voltage response of the temperature sensor. In one form the voltage threshold may be set to less than 20% of the initial voltage response.

The detecting may be performed via at least two spatially separated temperature sensors to provide sensitivity to direction of the flow in one dimension. Alternatively the detecting may be performed via at least three spatially separated temperature sensors to provide sensitivity to direction of said flow in up to two dimensions. The detecting may also be performed via at least four spatially separated temperature sensors to provide sensitivity to direction of said flow in up to three dimensions.

Applying of the heat pulse may be performed via at least two spatially separated heaters to provide sensitivity to direction of said flow in one dimension. Detecting of the decaying response may alternatively be performed via at least four spatially separated temperature sensors and applying the heat pulse may be performed via at least two heaters to provide sensitivity to rotation of the flow in two dimensions.

The method of the present invention may include compensating for variation in ambient temperature of the fluid. The compensating step may be performed by measuring the ambient temperature of the fluid immediately before applying the heat pulse and setting the voltage threshold relative to the ambient temperature. The compensating step may include storing an analog representation of the ambient temperature in a sample-and-hold circuit and setting the voltage threshold relative to the analog representation. Alternatively a digital representation of the ambient temperature may be stored and the voltage threshold may be set relative to the digital representation.

The step of applying a heat pulse may be performed via at least one heater and the step of detecting a decaying response may be performed via at least one temperature sensor. The method of the present invention may include mounting the at least one heater and the at least one temperature sensor on a diaphragm. The dimensions and material of the diaphragm may be selected to optimize sensitivity of the flow sensing, consistent with mechanical strength of the diaphragm.

The at least one heater and the at least one temperature sensor preferably are co-located such that access to the fluid is only required at one site. In one form the at least one heater and the at least one temperature sensor may be located on a sensor head such that the sensor head is rotationally symmetrical relative to an axis that is perpendicular to the flow of fluid. The at least one heater and the at least one temperature sensor may be located on a sensor head such that the method is sensitive to magnitude of the flow of fluid but is not sensitive to direction of the flow of fluid.

DETAILED DESCRIPTION OF THE PREFERRED EMBODIMENTS

Preferred embodiments of the present invention will now be described with reference to the accompanying drawings wherein.

Figure 1:
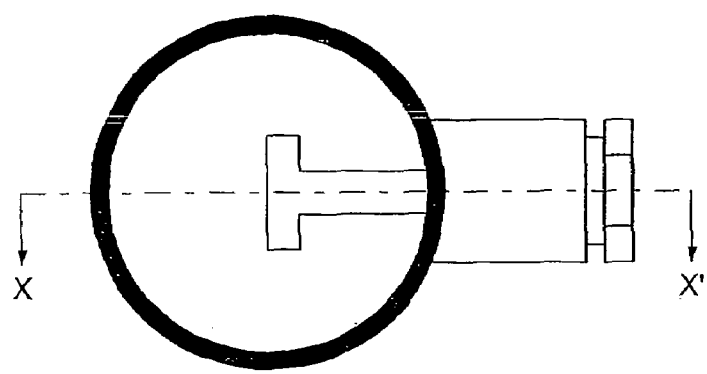
FIG. 1 illustrates a sensor head inserted into a pipe carrying fluid whose flow-rate is to be measured.
Figure 1:
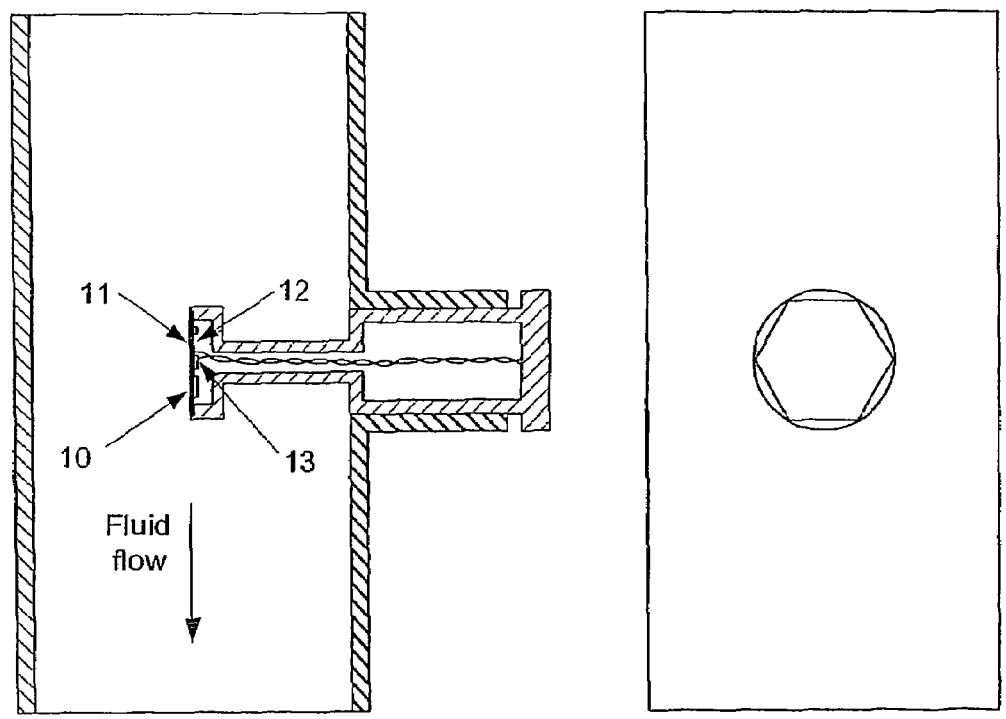

Referring to FIG. 1 the sensor head includes a thin diaphragm 10, typically of metal such as stainless steel or titanium (refer Australian Patent Applications 2002 952 359 and 2003 900 272). One side 11 of diaphragm 10 is in contact with the fluid, and may be termed the fluid face. Diaphragm 10 acts as a substrate for a thick-film hybrid integrated circuit, wherein electronic components are deposited or mounted on face 12 of diaphragm 10 remote from the fluid. Side 12 may be termed the component face of diaphragm 10. In manufacturing the thick-film circuit, an insulating layer is deposited on and fused to the component face, then circuit elements such as a heater, temperature sensor, resistors and conducting tracks (shown collectively by reference numeral 13) are created by screen-printing special inks and firing these in a furnace. Other components, such as integrated-circuit amplifiers and capacitors, are soldered on to the deposited tracks to complete required circuit functions.

In the present invention, the functions of the thick-film hybrid circuit include heating the substrate in a localized manner when a current pulse is applied, and detecting and amplifying changes in a temperature-sensor, such as a thermistor. An external control device may generate the current pulse and receive an electrical signal representing sensed temperature. In a preferred embodiment, a resistive bridge and an amplifier may be mounted on the substrate. Typically, the control device may include a microprocessor that processes the received electrical signal, in order to calculate, display and record fluid-flow rate.

Figure 2:
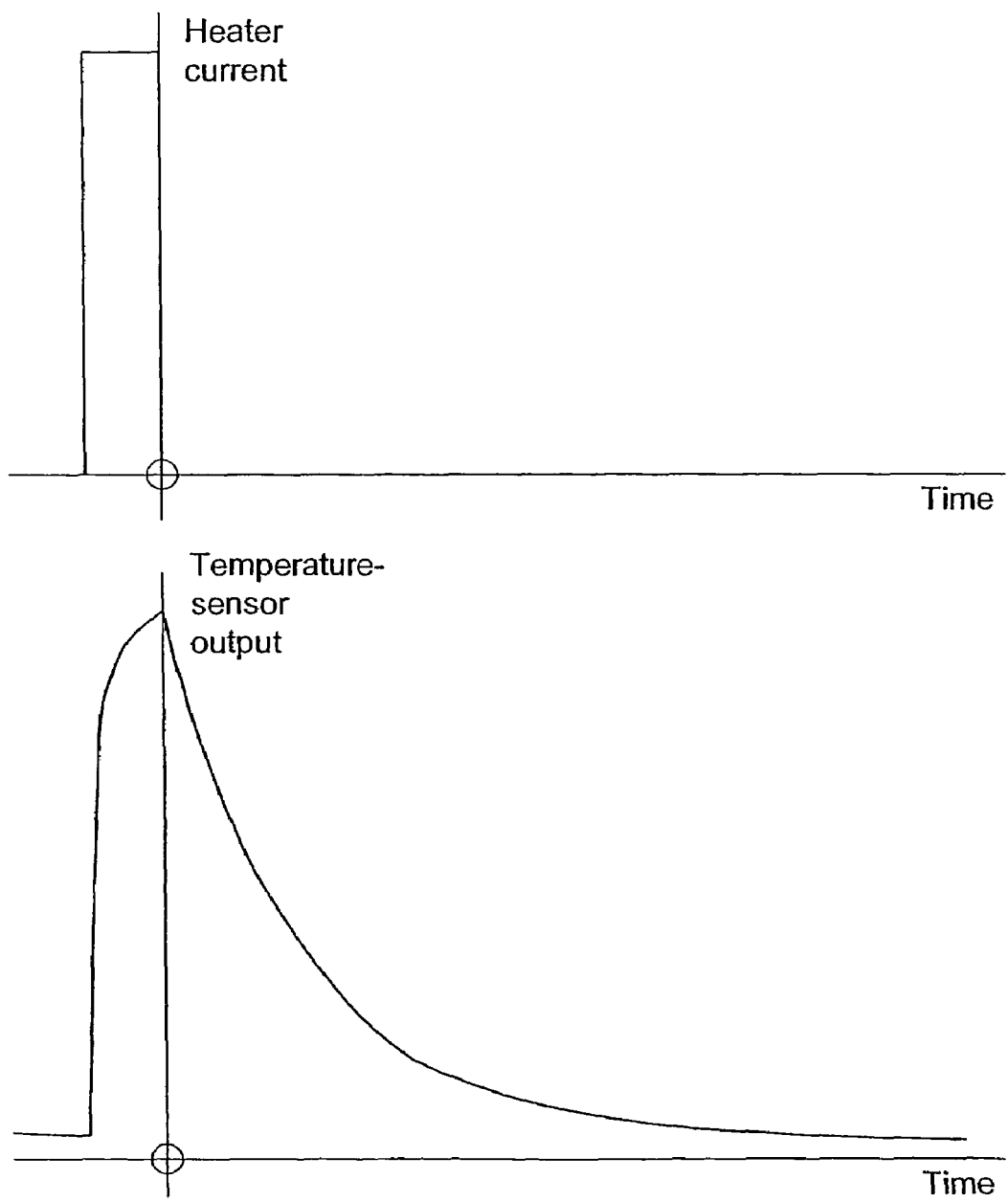
FIG. 2 shows a waveform associated with temperature response in relation to an applied heat-pulse.

The waveforms in FIG. 2 show how the output of the temperature sensor responds to an application of a brief electrical pulse to the heater. Where the sensing element is a thermistor in a bridge circuit, the sensor output is an amplified version of the bridge-unbalance voltage. Near the heater, substrate temperature increases quickly in response to the applied energy-pulse. It then decays slowly as heat is carried away from the heated part of the substrate. Some heat passes through the substrate into the fluid, and some flows radially through the substrate and is absorbed either by the fluid or the thermal mass of the associated housing that supports the substrate. The essential point is that passage of heat into the fluid is increased when there is a flow of fluid past the fluid-face of the diaphragm. That is, any increase in flow removes heat from the fluid face of the diaphragm more rapidly. This, in turn increases the thermal gradient through the diaphragm, and thus increases the rate of heat-transfer away from the heater and temperature-sensor. U.S. Pat. No. 5,610,331 describes a sensor that utilizes a decaying thermal-pulse response to distinguish between different fluids, rather than to measure fluid-flow rate.

Figure 3:
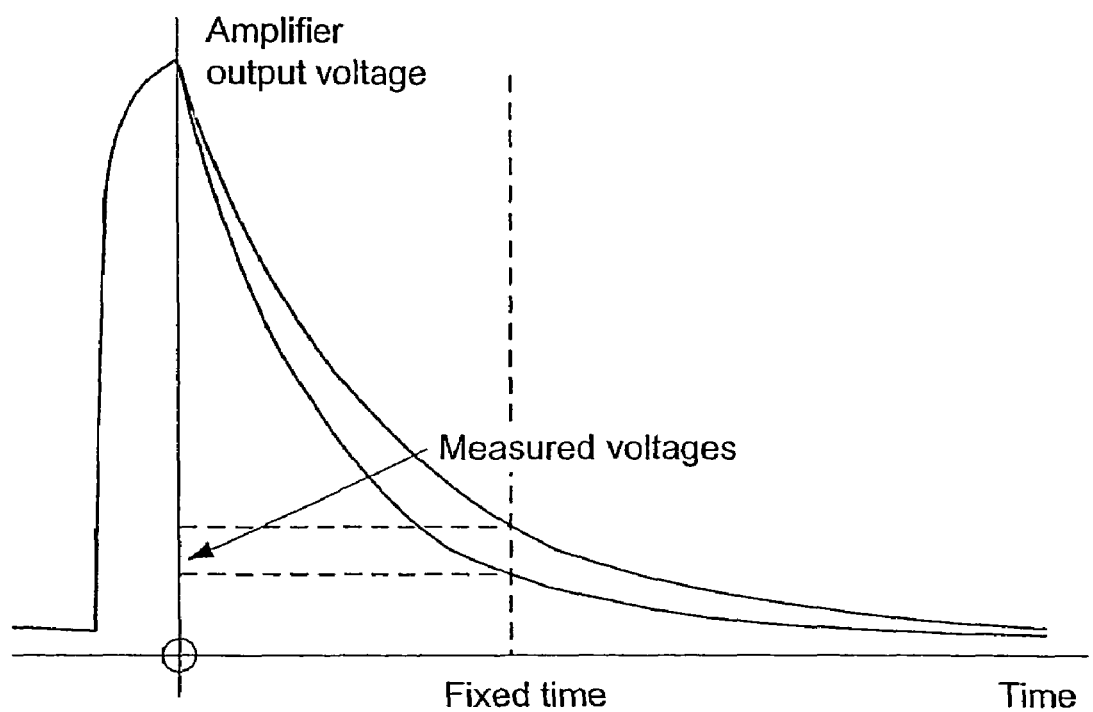
FIG. 3 shows a decaying temperature response and illustrates a method of determining flow rate by measuring decay at a fixed time.
Figure 4:
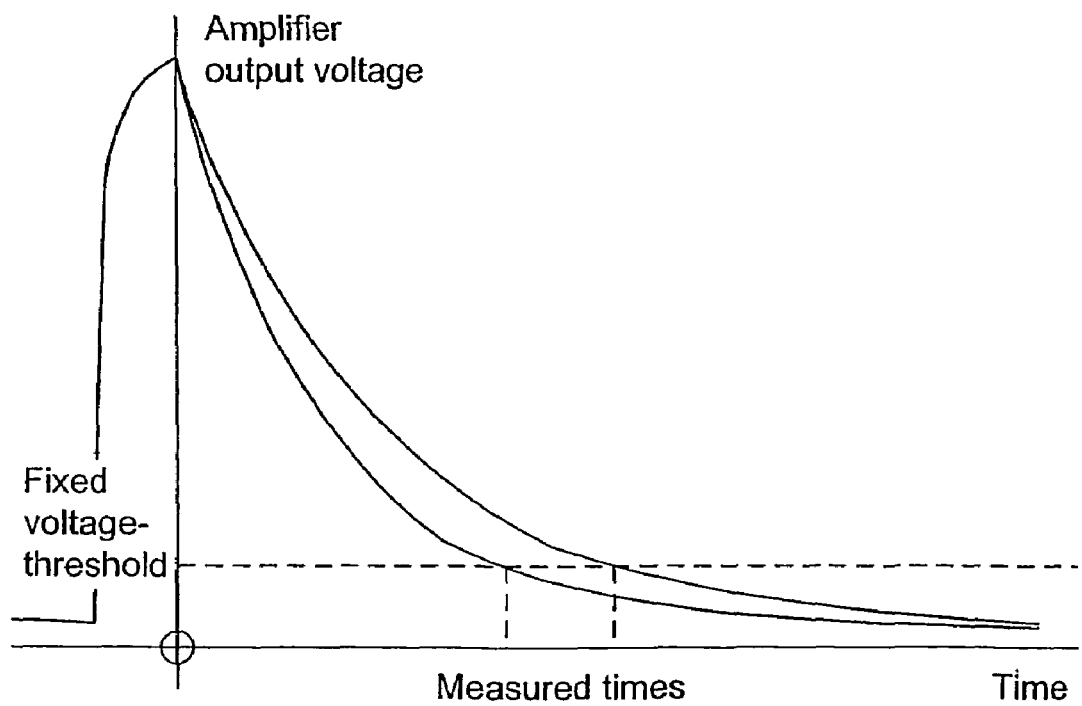
FIG. 4 shows a decaying temperature response and illustrates a further method of determining flow rate by measuring decay at a fixed threshold-level.

FIG. 3 shows amplified-voltage waveforms representing sensor temperature for two values of fluid flow. If voltage is measured after some fixed time, as indicated by the broken vertical dashed line, then a lower voltage represents a higher flow-rate because heat is removed more rapidly. FIG. 4 shows the same amplified voltage waveforms for an alternative method, in which the time at which the voltage falls below a voltage-threshold is measured, as indicated by the broken horizontal line. A shorter time to threshold represents a higher flow-rate. Both approaches are encompassed by the present invention, but the preferred embodiment is the one shown in FIG. 4, because it can provide a relatively high sensitivity to changes of flow, at a relatively low cost and low average power. This may be particularly valuable when small flow-rates are to be measured, for example when detecting leaks or small discharges from a high-capacity pipe or reticulation network.

The following discussion concerns the method shown in FIG. 4 in which a fixed voltage threshold is used, and the time taken for the pulse-response to decay to the threshold voltage is used as a measure of flow-rate. It will be evident from FIG. 4 that by setting a relatively low threshold voltage, the time to threshold increases, which in turn increases the sensitivity of a measurement. That is, when the decay curve has a low negative slope, a small change in either threshold voltage or amplifier-output voltage causes a relatively large change in the time taken to reach the threshold. While the high sensitivity that this confers is valuable, it also makes the measurement sensitive to changes of ambient fluid temperature and to random variations that may be caused by turbulence or other disturbances. Therefore, the present invention preferably includes means for compensating the effect of ambient fluid temperature.

The effect of variable ambient temperature may be compensated by measuring the amplified temperature-sensor output immediately before the heating pulse is applied, and setting the voltage-threshold relative to this pre-heating pulse value. This may be accomplished in either of two ways. In a first compensation method, an analog-to-digital converter (ADC) may be used to digitize the pre-heating pulse measurement, allowing a microcontroller to compute an adjusted threshold level. In many cases, the microcontroller itself will include the ADC. In this method, the time taken for the amplifier voltage to fall below the threshold may be determined by using the ADC to repeatedly sample and digitize the post-heating pulse amplifier output voltage.

A second method for compensating the effect of ambient temperature may include a sample-and-hold circuit to sample the pre-heating pulse output of the amplifier, and to set the subsequent voltage-threshold as an offset value or a multiple of the value held in the sample-and-hold circuit. This method requires an additional circuit function, that can be included on the substrate, but it has an advantage in that the microcontroller may not need to include an ADC, but may only need to keep count of the time taken for the amplifier voltage to fall below the threshold. This generally means that a relatively simple and inexpensive microcontroller can be used in the control device.

As mentioned above, temperature decay following application of a heating pulse depends on thermal conduction in the associated diaphragm 10 as well as the rate at which fluid flow carries heat away from the fluid face of diaphragm 10. In order to obtain high sensitivity to fluid flow, it is advantageous to make the diaphragm conduct heat well from one face (11) to the other (12) but to conduct poorly in a lateral or radial direction. These requirements are normally contradictory, so it is necessary to compromise in the choice of thermal conductivity, and to make diaphragm 10 thin relative to its radius or lateral dimension, as far as possible. For example, it may be advantageous to choose an alloy such as Grade 5 titanium, with relatively lower thermal conductivity and higher yield strength than a pure metal (refer Provisional Patent Applications 2002 952 359 and 2003 900 272). In some applications, a very thin diaphragm 10 may not be permissible, because diaphragm 10 will be subject to destructive pressure-differences, or may suffer flexure that affects electrical resistivity of elements such as the thermistor and bridge-resistors. It may also be beneficial to make the housing from a material having a low thermal conductivity such as plastics.

By selecting a material for diaphragm 10 that is suited to a particular application, it is possible to optimize the design of diaphragm 10, effecting a compromise between requirements for mechanical strength, close thermal connection between the heater and the fluid, weak thermal connection between the heater and the housing in which diaphragm 10 is mounted, and physical size of the housing. Some control over the combination of thermal conductivity and yield strength may be achieved by choosing a suitable grade of titanium or an alloy of titanium for diaphragm 10.

It will be evident, from the foregoing description and the illustration in FIG. 1, that the sensing head may be made rotationally symmetrical about an axis perpendicular to diaphragm 10, and that this may make the flow transducer relatively insensitive to rotation about the same axis. This rotational symmetry may confer a benefit in that there may be no need to orient the sensing head to a specific direction when inserting the head into the fluid stream, providing that its axis of symmetry is perpendicular to the direction of fluid flow. Using FIG. 1 as an example, this means that the sensing head may be mounted in a tapped pipe fitting without a need to accurately align the final orientation of the head, as would be necessary for a directionally-sensitive sensor.

The present invention has a further advantage over some other designs, in that orientation of the fluid flow and its enclosing pipe is unimportant. For example, the pipe may be horizontal or vertical without affecting the measurement. In the case of a vertical pipe, the flow may be upwards or downwards, also without affecting the measurement.

Utility of the invention is not restricted to flow in pipes filled with fluid. The sensing head can be inserted into fluid flowing in a channel, or into a substantially horizontal pipe that is partially filled with fluid. In these cases, the flow rate of the fluid can be sensed at one or more depths, and used to calculate or estimate the rate of volume flow. In cases where the pipe or channel might contain little or no fluid, the sensing head may be inserted from below and with its diaphragm flush with the wall at the bottom of the pipe or channel.

The flow transducer may be made directionally-sensitive to fluid flow by utilizing more than one temperature sensor. In one form two temperature sensors may be used. The temperature sensors may be spatially separated but still co-located with the heater in the sense that the sensors and heater are close enough to be incorporated into a single unit which is inserted into the fluid stream. In a directionally-sensitive flow transducer, the two sensors may be referred to as the upstream and downstream sensors relative to a normal or expected direction of flow. Of course, the roles of the two sensors may be exchanged if actual fluid flow is reversed for any reason. The response of a single sensor, or of both sensors in combination, may be used to determine magnitude of the fluid flow.

Possible arrangements of the sensors may include placement of one sensor offset from the heater in an upstream direction and the other sensor offset in a downstream direction, or one sensor printed above or underneath the heater and the other sensor spatially offset in either the upstream or downstream direction. In each of these arrangements, there will be a difference between the responses of the relatively upstream and downstream temperature sensors, and that difference will be dependent on the direction of fluid flow, as well as on factors such as lateral thermal conduction through diaphragm 10 on which the sensors are mounted.

The effect may be readily visualized in terms of a symmetrical structure, in which identical temperature-sensors are equally spaced from the heater. When no flow is present, the sensors will ideally have identical responses to a heat-pulse. When flow is present in the normal direction, relatively cool fluid will be carried towards the upstream sensor, counteracting to some extent conduction of heat towards this sensor through both diaphragm 10 and the fluid. On the other hand, relatively warm fluid will be carried towards the downstream sensor. Both the temperature-rise and subsequent temperature-decay pulse-shape will differ between the two temperature-sensing positions.

Such a symmetrical structure is advantageous in that it may provide a near-balance condition between the sensor responses at zero flow, and may therefore allow sensitive discrimination between zero flow and low-flow conditions, including directional discrimination. Notwithstanding this advantage, an asymmetrical arrangement of the sensors, such as placing one of them above or below the heater, may also provide an indication of flow direction.

The techniques for achieving high sensitivity to flow, discussed above with reference to FIGS. 3 and 4, are equally applicable to an embodiment that utilizes more than one temperature sensor. The pulse-decay method can be utilized for each of the upstream and downstream sensors, with a preferred embodiment again being based on the method described with reference to FIG. 4.

A directionally-sensitive flow transducer may also make use of more than one heater. In one form two heaters and one temperature sensor may be used, preferably in a symmetrical arrangement. In the latter arrangement heating pulses may be generated alternately in the upstream and downstream heaters, with the difference between successive temperature-sensor responses used both to quantify flow-magnitude and to determine its direction.

A still further embodiment of the present invention may include three or more temperature sensors, so that flow direction, as well as magnitude of flow, can be measured in any direction in a plane. Preferably, the transducer is provided with four sensors, spaced at equal radii and on orthogonal axes with respect to the heater, on a diaphragm that is circularly symmetric with respect to the heater, both mechanically and thermally. Such an arrangement combined with the pulse-decay sensing method described with reference to FIG. 4, may enable sensitive determination of the direction of flow. This may be required for example in order to measure movement of water that is a potential cause of soil erosion or deposition.

It is apparent that the principle proposed herein for measuring flow in two dimensions is also applicable to measurement of translational flow in three dimensions. The latter may make use of one heater and a minimum of four temperature sensors, but preferably six temperature sensors arranged about the heater in orthogonal symmetric pairs. It may also be apparent that the same principle is applicable to measurement of rotational flow in two dimensions, using two heaters and four temperature-sensors. The aforementioned translational or rotational flow-measurements may utilize a combination of two or more sensors that are not co-sited, or a specially-constructed transducer that can be regarded as a co-sited unit.

Notwithstanding the advantage that a co-sited sensor offers in many applications, a main benefit of the present invention is the relatively high flow-sensitivity and immunity to ambient fluid temperature, resulting from the thermal pulse and decay measurement process with reference to FIGS. 3 and 4. Therefore, the invention includes embodiments in which one or more temperature sensors is sited separately from the heater, and in which the sensing action relies on the detection of sensor-temperature decay in the manner described with reference to those Figures.

Finally, it is to be understood that various alterations, modifications and/or additions may be introduced into the constructions and arrangements of parts previously described without departing from the spirit or ambit of the invention.

What is claimed is:

1. A transducer for sensing flow of a fluid including heat pulse means for applying a heat pulse to said fluid and at least one temperature sensor, said temperature sensor being adapted to detect a decaying response to said heat pulse to provide an indication of said flow, wherein said decaying response is detected by comparing a measured voltage representing a temperature relative to a reference voltage at a set moment in time, and wherein said reference voltage corresponds to an initial decaying response associated with an initial flow rate.

2. A transducer according to claim 1 including at least two spatially separated temperature sensors adapted to provide sensitivity to direction of said flow in one dimension.

3. A transducer according to claim 1 including at least three spatially separated temperature sensors adapted to provide sensitivity to direction of said flow in up to two dimensions.

4. A transducer according to claim 1 including at least four spatially separated temperature sensors adapted to provide sensitivity to direction of said flow in up to three dimensions.

5. A transducer according to claim 1 wherein said heat pulse means includes at least two spatially separated heaters adapted to provide sensitivity to direction of said flow in one dimension.

6. A transducer according to claim 1 including at least four spatially separated temperature sensors and wherein said heat pulse means includes at least two heaters adapted to provide sensitivity to rotation of said flow in two dimensions.

7. A transducer according to claim 1 wherein said heat pulse means and said at least one temperature sensor are mounted on a diaphragm, the dimensions and material of which are selected to optimize sensitivity of said transducer to said flow, consistent with mechanical strength of said diaphragm.

8. A transducer according to claim 1 wherein said heat pulse means and said at least one temperature sensor are located such that access to said fluid is only required at one site.

9. A transducer according to claim 1 wherein said heat pulse means and said at least one temperature sensor are located on a sensor head such that said sensor head is rotationally symmetrical relative to an axis that is perpendicular to said flow.

10. A transducer according to claim 1 wherein said heat pulse means and said at least one temperature sensor are located on a sensor head such that said transducer is sensitive to magnitude of said flow but is not sensitive to direction of said flow.

11. A transducer for sensing flow of a fluid including heat pulse means for applying a heat pulse to said fluid and at least one temperature sensor, said temperature sensor being adapted to detect a decaying response to said heat pulse to provide an indication of said flow, wherein said decaying response is detected by comparing a measured time representing a temperature relative to a reference time at a set voltage threshold, and wherein said reference time corresponds to an initial decaying response associated with an initial flow rate.

12. A transducer according to claim 11 wherein said voltage threshold is set low relative to an initial voltage response of said at least one temperature sensor.

13. A transducer according to claim 12 wherein said voltage threshold is less than 20% of said initial voltage response.

14. A transducer according to claim 11 including compensating means for compensating for variation in ambient temperature of said fluid.

15. A transducer according to claim 14 wherein said compensating means includes means for measuring said ambient temperature of said fluid immediately before applying said heat pulse and first setting means for setting said voltage threshold relative to said ambient temperature.

16. A transducer according to claim 15 including a sample and hold circuit for storing an analog representation of said ambient temperature and second setting means for setting said voltage threshold relative to said analog representation.

17. A transducer according to claim 15 including storing means for storing a digital representation of said ambient temperature and third setting means for setting said voltage threshold relative to said digital representation.

18. A method for sensing flow of a fluid including applying a heat pulse to said fluid and detecting a decaying response to said heat pulse to provide an indication of said flow, wherein said decaying response is detected by comparing a measured voltage representing a temperature relative to a reference voltage at a set moment in time, and wherein said reference voltage corresponds to an initial decaying response associated with an initial flow rate.

19. A method according to claim 18 wherein said detecting is performed via at least two spatially separated temperature sensors to provide sensitivity to direction of said flow in one dimension.

20. A method according to claim 18 wherein said detecting is performed via at least three spatially separated temperature sensors to provide sensitivity to direction of said flow in up to two dimensions.

21. A method according to claim 18 wherein said detecting is performed via at least four spatially separated temperature sensors to provide sensitivity to direction of said flow in up to three dimensions.

22. A method according to claim 18 wherein said applying is performed via at least two spatially separated heaters to provide sensitivity to direction of said flow in one dimension.

23. A method according to claim 18 wherein said detecting is performed via at least four spatially separated temperature sensors and said applying is performed via at least two heaters to provide sensitivity to rotation of said flow in two dimensions.

24. A method according to claim 18 wherein said applying is performed via at least one heater and said detecting is performed via at least one temperature sensor.

25. A method according to claim 24 including mounting said at least one heater and said at least one temperature sensor on a diaphragm, the dimensions and material of which are selected to optimize sensitivity of said flow sensing, consistent with mechanical strength of said diaphragm.

26. A method according to claim 24 wherein said at least one heater and said at least one temperature sensor are located such that access to said fluid is only required at one site.

27. A method according to claim 24 wherein said at least one heater and said at least one temperature sensor are located on a sensor head such that said sensor head is rotationally symmetrical relative to an axis that is perpendicular to said flow.

28. A method according to claim 24 wherein said at least one heater and said at least one temperature sensor are located on a sensor head such that said method is sensitive to magnitude of said flow but is not sensitive to direction of said flow.

29. A method for sensing flow of a fluid including applying a heat pulse to said fluid and detecting a decaying response to said heat pulse to provide an indication of said flow, wherein said decaying response is detected by comparing a measured time representing a temperature relative to a reference time at a set voltage threshold, and wherein said reference time corresponds to an initial decaying response associated with an initial flow rate.

30. A method according to claim 29 wherein said detecting is performed via at least one temperature sensor and said voltage threshold is set low relative to an initial voltage response of said temperature sensor.

31. A method according to claim 30 wherein said voltage threshold is set to less than 20% of said initial voltage response.

32. A method according to claim 29 including compensating for variation in ambient temperature of said fluid.

33. A method according to claim 32 wherein said compensating is performed by measuring said ambient temperature of said fluid immediately before applying said heat pulse and setting said voltage threshold relative to said ambient temperature.

34. A method according to claim 33 including storing an analog representation of said ambient temperature in a sample-and-hold circuit and setting said voltage threshold relative to said analog representation.

35. A method according to claim 32 including storing a digital representation of said ambient temperature and setting said voltage threshold relative to said digital representation.

* * * * *